United States Patent [19]
Ohsawa

[11] Patent Number: 5,554,913
[45] Date of Patent: Sep. 10, 1996

[54] BLOWER SYSTEM FOR VEHICLE AIR-CONDITIONERS

[75] Inventor: Hiroshi Ohsawa, Ohsato-gun, Japan

[73] Assignee: Zexel Corporation, Tokyo, Japan

[21] Appl. No.: 354,045

[22] Filed: Dec. 6, 1994

[30] Foreign Application Priority Data

Dec. 7, 1993 [JP] Japan .................................. 5-339823

[51] Int. Cl.$^6$ ................................................. H02K 17/32
[52] U.S. Cl. .......................... 318/434; 318/433; 318/254; 318/445; 388/915; 388/909
[58] Field of Search ................................ 318/254, 138, 318/439, 434, 433, 807, 445, 461; 388/915, 809–815, 909

[56] References Cited

U.S. PATENT DOCUMENTS

| | | | |
|---|---|---|---|
| Re. 33,167 | 2/1990 | Moosmann et al. | 388/909 X |
| 3,584,282 | 6/1971 | Reeves et al. | 318/434 X |
| 4,409,533 | 10/1983 | Kawabata | 318/807 |
| 4,418,304 | 11/1983 | Iwai | 318/434 X |
| 4,639,649 | 1/1987 | Seto | 388/809 X |
| 5,019,757 | 5/1991 | Beifus | 318/254 |
| 5,408,573 | 4/1995 | Jamieson et al. | 388/815 |

FOREIGN PATENT DOCUMENTS 3-195389  8/1991  Japan .

Primary Examiner—William M. Shoop, Jr.
Assistant Examiner—Karen Masih
Attorney, Agent, or Firm—Pollock, Vande Sande & Priddy

[57] ABSTRACT

For enabling discrimination of whether or not a blower motor is in a locked state to be conducted promptly and reliably irrespective of the motor speed, a blower system comprises a discrimination circuit for discriminating whether or not the blower motor is in a locked state based on change in the position of the rotor of the motor, and the discriminating time period between motor locking and output of a discrimination signal is determined to be shorter for a higher set rotational speed of the motor in response to the speed setting operation of a motor speed setting device.

3 Claims, 4 Drawing Sheets

BLOWER SYSTEM FOR VEHICLE AIR-CONDITIONERS

BACKGROUND OF THE INVENTION

1. Field of the Invention

The present invention relates to a blower system for vehicle air-conditioners, which is capable of discriminating whether or not a blower is in a locked state preventing it from rotation.

2. Prior Art

The blowers or motors employed in vehicle air-conditioner blower systems often lock up and become incapable of rotation even when the required driving current is supplied thereto. This happens, for example, when an object is drawn in through the air intake. To prevent the motor and/or the associated peripheral circuitry from being damaged at such times, it is necessary to cut off the power to the motor as soon as it locks. For this, the conventional vehicle air-conditioner blower system is provided with a lock discrimination circuit for discriminating whether or not the motor is in a locked state. For example, Japanese Patent Application Public Disclosure No. Hei 3-195389 teaches a lock discrimination circuit arranged to discriminate whether or not the motor is in a locked state based on the rotation condition of the rotor of the motor and to stop the supply of power to the motor when the locked state is discriminated.

The conventional blower system with this lock discrimination circuit is not altogether satisfactory, however, especially when the system is set in the low-motor-speed operation mode. This is because the long time required for the motor to start in this operation mode makes it necessary to set a long discriminating time period so as to avoid erroneously discriminating that the motor is locked. More specifically, if a short period is set for the discrimination in the low-motor-speed operation mode, the lock discrimination circuit may conclude that the motor has locked before it has been able to get started.

On the other hand, an attempt to avoid this problem by setting a long period for the discrimination encounters a problem when the motor locks up while running at high speed in the high-motor-speed operation mode, because the semiconductors and other components for controlling the current flowing through the motor coil are likely to be damaged by the large amount of power that is apt to be consumed in the driving circuit before the current supply to the motor is cut off.

SUMMARY OF THE INVENTION

It is an object of the present invention to provide a blower system for vehicle air-conditioners which is capable of overcoming the above-mentioned drawbacks of the conventional system.

It is another object of the present invention to provide a blower system for vehicle air-conditioners which is capable of promptly and reliably discriminating within an appropriate time period relative to the rotational speed of the blower or motor whether or not the motor is in a locked state.

It is a further object of the present invention to provide a blower system for vehicle air-conditioners that use brushless motors, which is capable of promptly and reliably discriminating whether or not the brushless motor is in a locked state.

For achieving these objects, the present invention provides a blower system for vehicle air-conditioners having a blower, a motor for rotationally driving the motor and a setting device for setting a rotational speed of the blower or motor, the system comprising a position detecting circuit for outputting a position signal representing the position of a rotor of the motor and a discrimination circuit responsive to the position signal for discriminating from change in the position of the rotor whether or not the motor is in a locked state and responsive to the setting device for determining the discriminating time period, defined as that between motor locking and output of a discrimination result signal, to be shorter for a higher set rotational speed.

Another aspect of the invention provides a blower system for vehicle air-conditioners having a blower, a direct current brushless motor for rotationally driving the blower, a magnetic detecting means for producing an electric pulse signal related to the position of a rotor of the direct current brushless motor, the magnetic detecting means having an electromagnetic transducer such as a Hall element, a setting device for producing a set signal representing a set rotational speed of the motor, and a control circuit responsive to the output of the magnetic detecting means and the output of the setting device for controlling exciting current supplied to the direct current brushless motor for producing a rotational torque in the rotor, the system comprising a signal processing circuit means responsive to the electric pulse signal for producing a saw-tooth wave signal whose period and peak value change in accordance with the rotational speed of the rotor, a reference signal generating means for generating a reference signal, and a discrimination circuit for discriminating whether or not the motor is in a locked state by comparing the saw-tooth wave signal with the reference signal and generating a discrimination result signal, the level of the reference signal being set in response to the set signal for shortening the time period between motor locking and output of a discrimination result signal as the set rotational speed is higher.

Thus in accordance with this invention, the period for discriminating whether or not the motor is locked is set to be long when the set rotational speed of the motor is set relatively low, enabling the discrimination to be conducted reliably and without error in the low-speed mode. On the other hand, the period for the discrimination is shortened when the set rotational speed of the motor is high, enabling the discrimination result signal to be produced in a short time and ensuring that the driving circuit and the like will not be damaged if the motor locks in the high-speed mode.

This invention will be better understood and other objects and advantages thereof will be more apparent from the following detailed description of preferred embodiments with reference to the accompanying drawings.

DESCRIPTION OF THE PREFERRED EMBODIMENT

Figure 1:
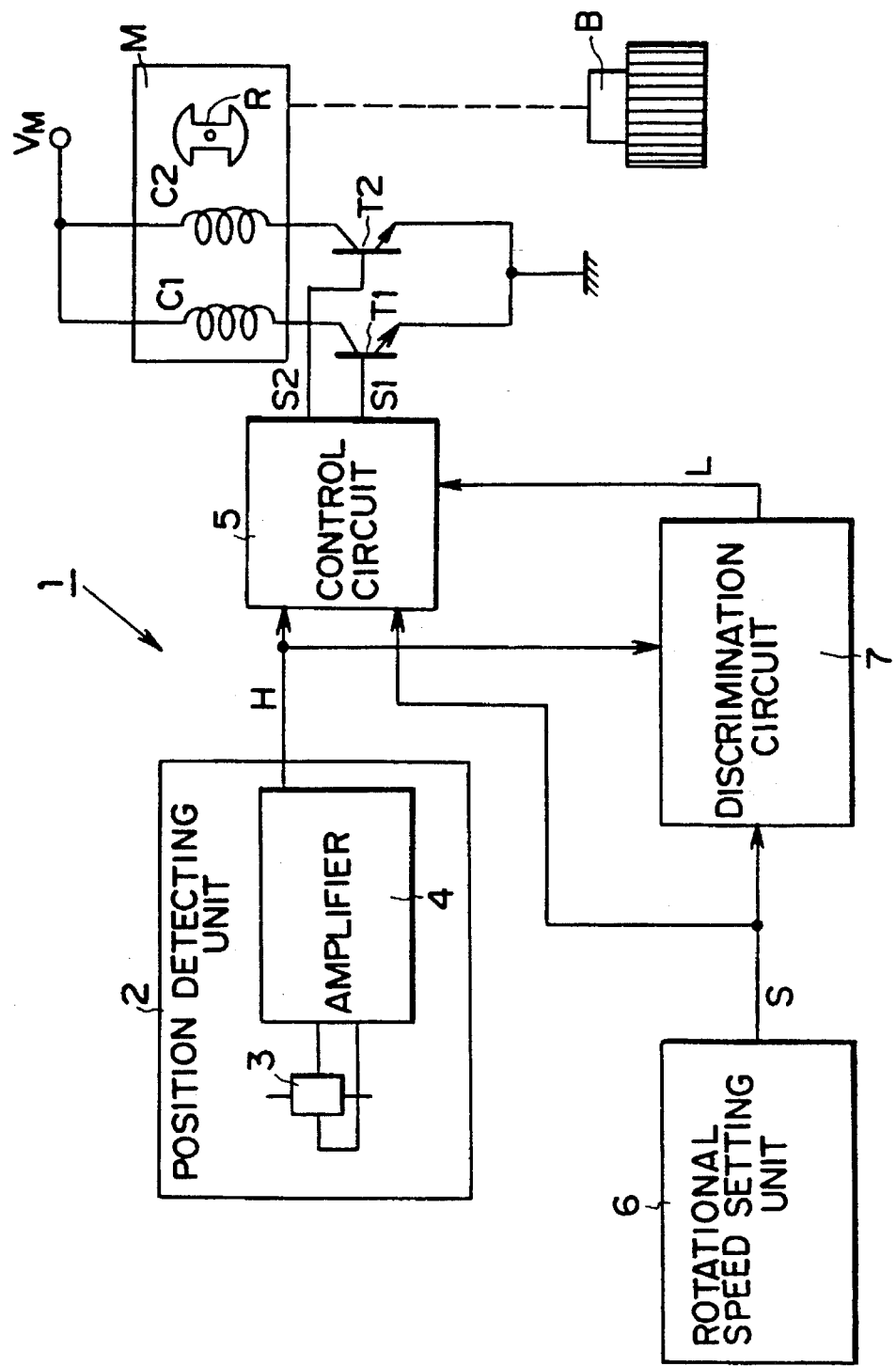
FIG. 1 is a block diagram of an embodiment of a blower system according to the present invention.

FIG. 1 is a block diagram of an embodiment of a blower system according to the present invention. The system is for use in conjunction with a vehicle air-conditioner and employs a direct current brushless motor for rotating a blower. A blower system 1 comprises a blower B supported rotatably by a supporting member (not shown) and a direct current brushless motor M for rotationally driving the blower B. In this embodiment the direct current brushless motor M is of the two phase type and has a magnet rotor R and exciting coils C1 and C2 provided on a stator (not shown).

The blower system 1 is further provided with a position detecting unit 2 for obtaining information concerning the rotational position of the magnet rotor R. The position detecting unit 2 is of the conventional type having a Hall element 3 for producing a detection signal showing the position of the magnet rotor R and an amplifier 4 for amplifying the output detection signal from the Hall element 3. Although not shown in FIG. 1, the Hall element 3 is actually incorporated into the direct current brushless motor M where it senses leakage flux from the magnet rotor R. The position detecting unit 2 produces a pulse voltage signal whose level changes in relation to the rotational position of the magnet rotor R and outputs the same as a position signal H. Although omitted from FIG. 1 in the interest of simplicity, the position detecting unit 2 is also provided with a conventional direct current bias circuit for supplying a direct current bias current to the Hall element 3.

The exciting coils C1 and C2 are connected through associated switching transistors T1 and T2 with a direct current power supply $V_M$ for driving the direct current brushless motor M. The conducting states of the switching transistors T1 and T2 are controlled by a pair of control signals S1 and S2 produced by a control circuit 5 which operates in response to the position signal H to selectively supply the necessary exciting current to the exciting coils C1 and C2 in a prescribed time and order. The control circuit 5 is configured to on-off control the switching transistors T1 and T2 in a conventional manner so as to supply the exciting currents required for maintaining the rotation of the magnet rotor R from the direct current power supply $V_M$ to the respective exiting coils at the appropriate times. Since the circuit configuration of the control circuit 5 operating in the foregoing manner is known, it will not be described further here.

A rotational speed setting unit 6 is used by the operator to set the desired rotational speed of the direct current brushless motor M or blower B. It produces a speed setting voltage S representing the set rotational speed and the speed setting voltage S is forwarded to the control circuit 5 and a discrimination circuit 7.

Figure 2:
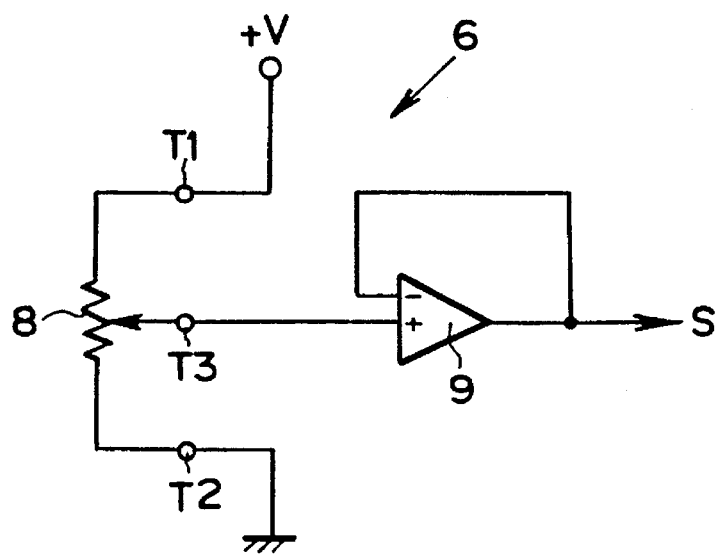
FIG. 2 is a detailed circuit diagram of the speed setting unit of the blower system shown in FIG. 1.

As shown in FIG. 2, the rotational speed setting unit 6 has a variable resistor 8 with fixed terminals T1 and T2 across which is impressed a direct current voltage +V supplied from a direct current stabilized power supply (not shown), and the divided voltage appearing on a movable terminal T3 thereof is applied to a buffer amplifier 9 to produce the speed setting voltage S therefrom.

Figure 3:
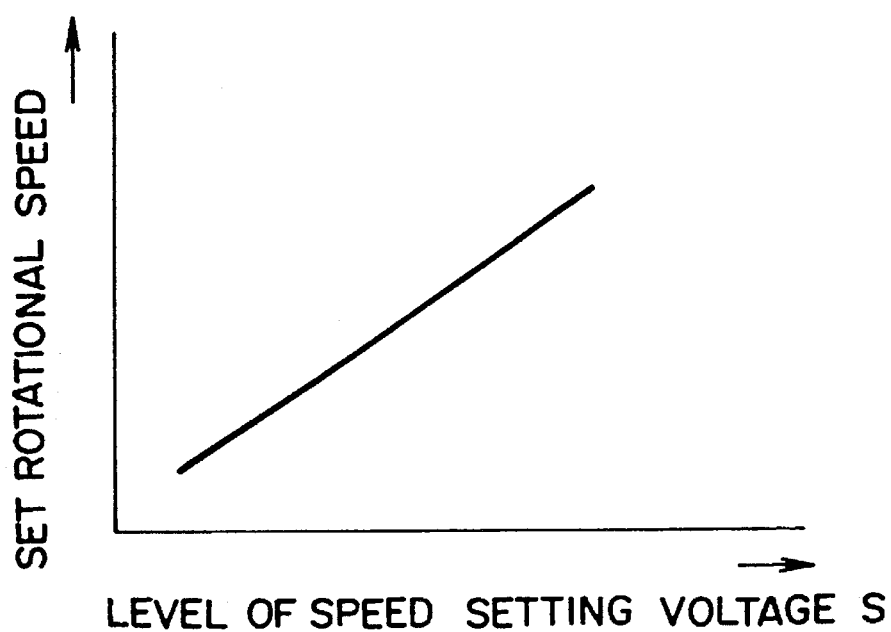
FIG. 3 is a graph showing a characteristic of the speed setting unit shown in FIG. 2.

As will be understood from the characteristic curve of the rotational speed setting unit 6 shown in FIG. 3, the level of the speed setting voltage S increases as the speed set by the variable resistor 8 increases.

As seen in FIG. 1, the blower system 1 comprises the discrimination circuit 7, which is responsive to the speed setting voltage S and the position signal H and serves to discriminate whether or not a motor locked state has occurred. A "motor locked state" is defined as a state in which the direct current brushless motor M does not rotate irrespective of the supply of driving current thereto. When the occurrence of a motor locked state is discriminated by the discrimination circuit 7, the discrimination circuit 7 produces as a discrimination signal a current control signal L which in this embodiment is used for limiting the level of the driving currents supplied to the exciting coils C1 and C2 to less than a predetermined level so as to protect the direct current brushless motor M and the circuitry associated therewith.

Figure 4:
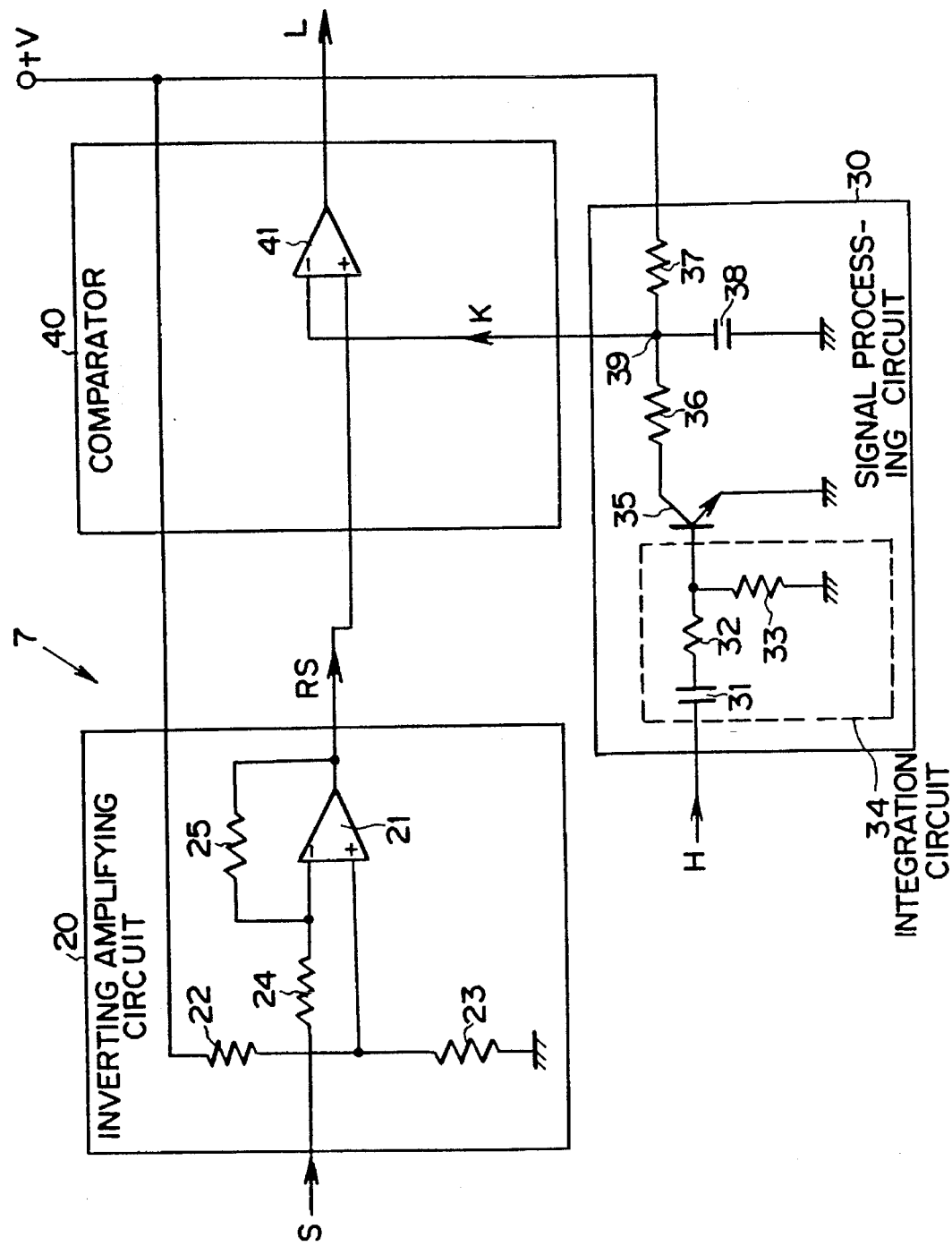
FIG. 4 is a detailed circuit diagram of the lock discrimination circuit of the blower system shown in FIG. 1.

The circuit of the discrimination circuit 7 will now be described in detail with reference to FIG. 4. The discrimination circuit 7 receives the direct current voltage +V from the stabilized d.c. power supply (not shown). The circuit 7 comprises an inverting amplifying circuit 20 for inverting in level and amplifying the speed setting voltage S, a signal processing circuit 30 responsive to the position signal H for producing a detection output signal K whose peak level corresponds to the rotational speed of the magnet rotor R, and a comparator 40 for comparing the level of the detection output signal K with the level of an inverted output voltage RS produced by the inverting amplifying circuit 20.

Figure 5:
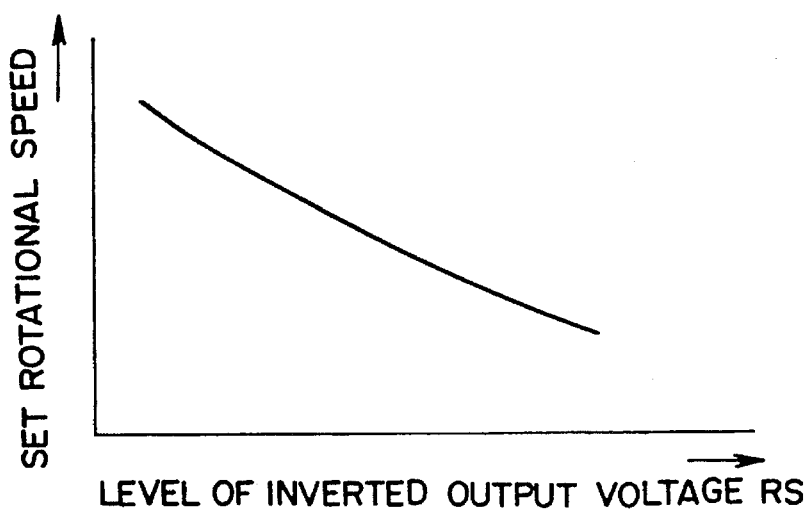
FIG. 5 is a graph showing a characteristic of the inverting amplifying circuit of the lock discrimination circuit shown in FIG. 4.

The inverting amplifying circuit 20 is a circuit of known configuration comprising an operational amplifier 21 and resistors 22 and 25, and, as will be understood from FIG. 5, the level of the inverted output voltage RS decreases with increasing set rotational speed.

The signal processing circuit 30 has a transistor 35 and an integration circuit 34 composed of a capacitor 31 and resistors 32 and 33. The integration circuit 34 integrates the square wave position signal H and its output on-off controls the transistor 35. The emitter of the transistor 35 is grounded and the direct current voltage +V is applied to its collector through resistors 36 and 37. The connection point 39 between the resistors 36 and 37 is grounded through a capacitor 38. As a result, the detection output signal K is obtained at the connection point 39 in the form of a saw-tooth wave whose peak value and cycle period vary with the period of the position signal H.

The comparator 40 is composed of a voltage comparator 41 having an inverting input + to which the inverted output voltage RS is applied and a non-inverting input − to which the detection output signal K is applied.

Figure 6:
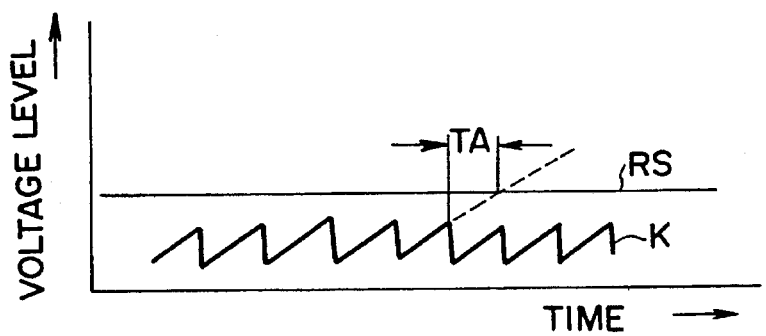
FIG. 6 is a wave form chart for explaining the operation of the lock discrimination circuit when the motor of the blower system of FIG. 1 is operated in the high-speed mode.

The operation of the discrimination circuit 7 will now be described with reference to FIGS. 6 and 7. In the case where the set rotational speed of the direct current brushless motor M is high, the level of the inverted output voltage RS has a relatively small magnitude. When the direct current brushless motor M is rotating at a high speed corresponding to the set rotational speed, the cycle period of the saw-tooth wave of the detection output signal K is short and the peak value thereof is small. The wave form of the signal K at this time is illustrated in FIG. 6. If the direct current brushless motor M should for some reason lock while operating in this state, the level of the detection output signal K will rise as shown by the broken line in FIG. 6. As a result, it will quickly exceed the level of the inverted output voltage RS, which constitutes a reference level and is at a relatively low level at this time. The level of the current control signal L produced by the voltage comparator 41 will therefore drop to a low level after time TA. Since the control circuit 5 responds to the drop in the level of the current control signal L by conducting a current limiting operation, the direct current brushless motor M and circuitry associated therewith are effectively protected.

Figure 7:
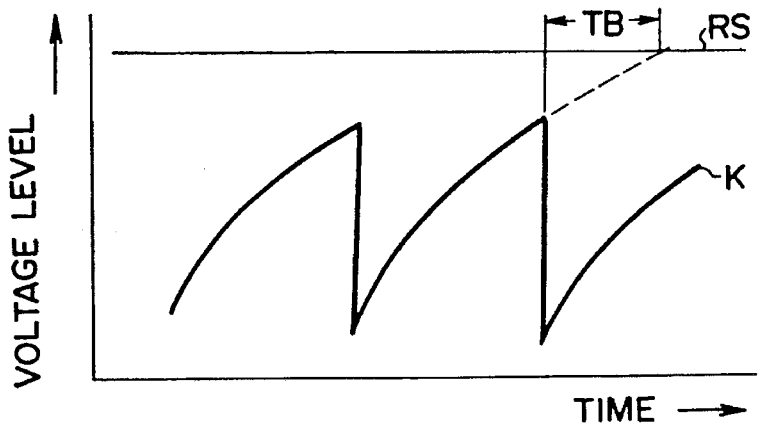
FIG. 7 is a wave form chart for explaining the operation of the lock discrimination circuit when the motor is operated in the low-speed mode.

On the other hand, as will be understood from FIG. 7, when the set rotational speed of the direct current brushless motor M is low, the inverted output voltage RS, which serves as a reference level, is set to a higher level than in the case shown in FIG. 6. As can also be seen in FIG. 7, when the direct current brushless motor M is rotating at a low speed corresponding to the set rotational speed, the cycle period of the detection output signal K is longer and the peak value thereof is higher than in the case shown in FIG. 6. If the direct current brushless motor M should for some reason lock while operating in this state, the level of the detection output signal K will rise as shown by the broken line in FIG. 7. Although in this case, too, the detection output signal K will eventually rise above the level of the inverted output voltage RS and cause the current control signal L to drop to a low level, the time TB required for it to do so is much longer than the time TA required in the case shown in FIG. 6.

As will be understood from the foregoing description, the detection output signal K maintains its saw-tooth wave form so long as the direct current brushless motor M is rotating. When the direct current brushless motor M locks, however, its level increases to that of the power supply voltage +V. On the other hand, the reference voltage with which the detection output signal K is compared is not a voltage signal of prescribed constant level but the inverted output voltage RS whose level changes in accordance with the set rotational speed of the direct current brushless motor M as described with reference to FIGS. 6 and 7. Consequently, when the direct current brushless motor M is rotating at high speed, the discriminating time period (the time period between the point at which motor M locks and the point at which the level of the signal L becomes low) is short, as indicated by TA in FIG. 6. In contrast, when the motor M is rotating at low speed, the discriminating time period is longer than that during high-speed rotation, as indicated by TB in FIG. 7. As a result, in low-speed operating mode the system prevents erroneous discriminations to the effect that the motor M has locked before it has been able to start, while in high-speed operation mode it shortens the discrimination time period and thus protects the motor M and the circuitry associated therewith from damage by ensuring prompt limiting of the driving currents when locking occurs.

What is claimed is:

1. A blower system for vehicle air-conditioners, comprising:

a blower;

a direct current brushless motor for rotationally driving said blower;

a magnetic detecting means for producing an electric pulse signal related to the position of a magnetic rotor of said motor, a frequency of said electric pulse signal varying with the rotational speed of said motor, and the cycle period and peak value of said electric pulse signal increasing with decreasing rotational speed of said motor;

a setting device for producing a set signal representing a set rotational speed of the motor;

control circuit means responsive to the electric pulse signal and the set signal for controlling an exciting current supplied to said motor for producing a rotational torque in the magnetic rotor;

signal processing circuit means responsive to the electric pulse signal for producing a saw-tooth wave signal, said signal processing circuit means comprising means for changing the cycle period and peak value of aid saw-tooth wave signal in relation to the rotational speed of the magnetic rotor;

reference signal generating means for generating a reference signal, the level of said reference signal increasing as the set rotational speed of the motor decreases; and a discrimination circuit for generating a discrimination signal based on a comparison of said saw-tooth wave signal with the reference signal and indicating whether or not said motor is in a locked state;

said reference signal generating means comprising means responsive to said set signal for setting the level of the reference signal such that the time period between motor locking and output of the discrimination signal becomes shorter as the set rotational speed of the motor becomes higher.

2. A system as claimed in claim 1, wherein said magnetic detecting means includes electromagnetic transducing means responsive to a leakage flux of the magnetic rotor for producing a detection signal representing the positional state of the magnetic rotor.

3. A system as claimed in claim 2, wherein the electric pulse signal is formed based on the detection signal.

* * * * *